Aug. 28, 1951  W. KLEINER  2,566,131
METHOD FOR THE MOLDING OF PLASTIC ARTICULATORS
Filed Aug. 12, 1947
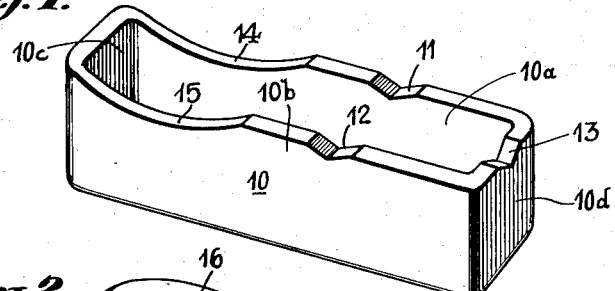
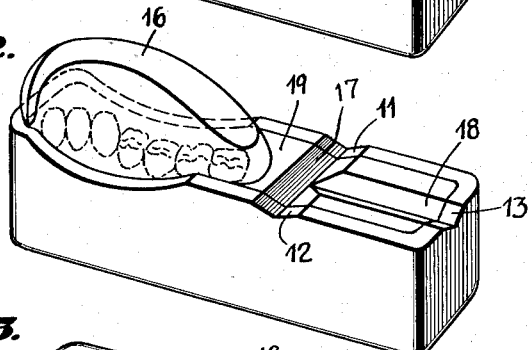
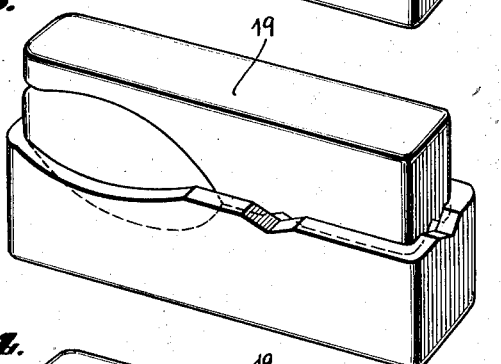
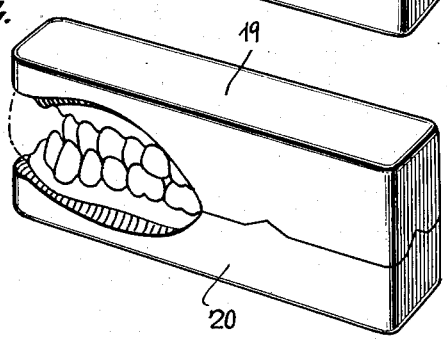
INVENTOR.
WILLY KLEINER.
ATTORNEYS.

Patented Aug. 28, 1951

2,566,131

UNITED STATES PATENT OFFICE 2,566,131

METHOD FOR THE MOLDING OF PLASTIC ARTICULATORS

Willy Kleiner, Rapperswil (St. Gallen), Switzerland

Application August 12, 1947, Serial No. 768,098
In Switzerland August 17, 1946

3 Claims. (Cl. 18—55.1)

This invention relates to dental articulators, and more particularly to a method for the molding of plaster articulators and to means for executing such a method.

Plaster models of articulators have in the past required a very long period to prepare because they have had to be built up by hand and laboriously cut to shape. Moreover, satisfactory devices for molding plaster articulators in a short time have not been heretofore suggested.

The present invention relates to a method for the molding of such articulators which by the employment of a novel device for such molding enables the preparation of highly accurate and clean articulators at a considerable saving of time and expense.

Various, further and more specific objects, features and advantages of the invention will clearly appear from the detailed description given below taken in connection with the accompanying drawings which form a part of this specification and illustrate, by way of example, a preferred arrangement for carrying out the invention. It is to be expressly understood that the drawings are for purposes of illustration only and do not define the limits of the invention, reference for this latter purpose being had to the appended claims.

In the drawings:

Fig. 1 is a perspective view of the novel mold which is employed in executing the novel method disclosed herein;

Fig. 2 is a perspective view of the mold shown in Fig. 1 but filled with plaster and with a unilaterally plaster filled denture impression pressed into the plaster in said mold;

Fig. 3 illustrates a completed half model of the articulator which has been removed from the mold after hardening and with the denture impression attached thereto, the impression being filled with plaster upon the other side thereof, and pressed into soft plaster within said mold; and Fig. 4 shows the completed plaster model after the removal of the denture impression.

The novel method consists in filling one side of a denture impression with plaster and pressing this filled impression into an oblong mold of elastic material that has likewise been filled up with plaster; thereafter the excess plaster is removed from the mold to the level of the upper edge of the mold. The upper edge of the mold is provided with a pair of oppositely disposed notches which extend transversely thereof, there also being a longitudinally extending notch which preferably is axially perpendicular to the first mentioned notches. The removal of the plaster down to the level of the upper edge of the mold thus forms a fitting surface comprising a pair of grooves in the plaster which are in alignment with said notches. The plaster in the mold, including the plaster in the denture impression, comprises the first model half of the articulators. After the hardening of the plaster in this first half, it is removed from the mold with the denture impression still attached thereto. Of course, the hardened plaster should be coated with a material such as shellac to facilitate separation thereof from the plaster of the second model half. Handling means are provided in the neighborhood of the channels at the rear of the model half. Thereafter the other side of the denture impression is filled with plaster and the mold is again filled with plaster. The first model half, together with the plaster in the last filled side of said impression, is pressed into the soft plaster presently in the mold. The first model half is guided by the mold while it is being pressed into said soft plaster. The above-mentioned fitting surface comprising channels or grooves in the first model half thus forms suitable ridges in the soft plaster of the second model half and provides for a proper fitting of the two model halves after completion thereof. Thereafter the excess plaster is removed and after the hardening of this second model half the mold and the denture impression are removed from the completed model.

Referring to the drawings in further detail, the device for the molding of the plaster articulator consists of an oblong mold 10 having generally a rectangular ground plan. Thus the mold, in the form shown, is in the shape of a tube or vessel having a generally rectangular cross-section open at least at the top. The mold 10 has longitudinal walls 10a and 10b and transverse or end walls 10c and 10d.

In order to facilitate the formation of a fitting surface or guiding channels in the plaster of each model half, the upper edges of the longitudinal walls 10a and 10b have formed therein oppositely disposed notches 11 and 12.

A third notch 13 is provided in the rear wall 10d, said notch being preferably axially perpendicular to notches 11 and 12.

In order to facilitate the removal of plaster in an advantageous manner whereby interference between the opposed model halves of the articulators is avoided (by reason of excess or overhanging plaster in the front portion of the mold) the upper edges of the front portions of the longitudinal walls 10a and 10b are formed lower than the rest of the upper edge of the mold, for example, by cutting away arcuate portions as at 14 and 15.

It is desirable for the interior corners of the mold to be slightly rounded whereby the extraction of the plaster from the mold is assisted. The mold 10 preferably is of some elastic material such as rubber or artificial resin in order to permit easy removal of the plaster after hardening thereof.

The above-described elastic mold makes it possible to prepare an extremely accurate and clean plaster articulator in a much shorter time than heretofore possible and to a degree of accuracy higher than heretofore attained. The novel method employed for this purpose is as follows:

The mold 10 and one side of a denture impression 16 are filled up with plaster and the filled side of said impression is pressed into the plaster within the mold 10 in the forward or front region thereof between the upper edge portions 14 and 15. This is done in such a way that the mesial plane of said denture impression coincides at least approximately with the plane as determined by the inner surface of longitudinal side 10b. Thereafter, while the plaster is soft, the excess is removed, for example, by scraping with a knife along the edge of the mold, whereby there is produced in the plaster a channel or notch 17 which corresponds with the edge notches 11 and 12 (Fig. 2). Thereafter, a lengthwise notch 18 is formed which corresponds with the notch 13 and which extends from the latter notch up to channel 17. The channels 17 and 18 are preferably perpendicular and comprise a so-called "fitting surface" adapted for cooperating with ridges which fit therein and which comprise parts of the other half of the model.

The first model half is constituted by the plaster 19 within the mold (Fig. 2) plus the plaster within the unilaterally filled denture impression which has been pressed into the plaster.

After the plaster of the first model half has hardened (Fig. 2), it is removed from the elastic mold and is coated with a material such as shellac to facilitate separation from the plaster of the second model half to be described below.

The second model half now can be formed by filling the mold 10 once more with plaster, filling the second side of the impression 16 with plaster, and pressing the first model half (plus the filled second side of the denture impression) into the soft plaster presently in the mold. The denture impression 16 thus is not detached from the first model half at the time of the pressing of said first model half upon the soft plaster (Fig. 3).

It is important that the level to which the mold is filled with plaster to form the second model half be somewhat below the upper edge of the cylindrical casing comprising the mold because it is desirable for the first model half, when impressed upon the soft plaster, to be guided by the inner wall of the mold 10 substantially throughout the periphery of the first model half.

As a result of the pressing of the first model half upon the mass of plaster comprising the second filling of the mold, the exact negative of said fitting surface is impressed into this mass of plaster. After the hardening of the second plaster filling, which comprises a second model half 20 (together with the filling of the second side of the denture impression), the mold 10 is removed therefrom. At this point the two model halves 19 and 20 are interconnected by the denture impression 16. The latter now can be removed and the plaster articulator is now complete as shown in Fig. 4.

The position of the lower row of teeth of the model half 20 is secured in proper relation to the upper row of teeth of the model half 19, by means of the positive engagement of the fitting surfaces of the two halves. The contiguous surfaces of the two model halves thus are locked flush one upon the other.

The guiding of the first model half (by means of the mold 10) when it is pressed into the plaster comprising the second filling of the mold, and the formation of suitable surfaces for the locking of the two model halves in proper relative position, together with the resilient nature of the mold which facilitates detachment thereof from the plaster, comprise aspects of the invention which assist in shortening the time of making articulators, and enable the accurate and easy positioning of the two model halves.

While the invention has been described with respect to a certain preferred example which has given satisfactory results, it will be understood by those skilled in the art after understanding the invention that various changes and modifications may be made without departing from the spirit and scope of the invention and it is intended therefore in the appended claims to cover all such changes and modifications.

What is claimed is:

1. The method for the molding of plaster articulators which consists in filling in a denture impression unilaterally with plaster; pressing the filled side of the impression into a plaster filled mold; removing the excess plaster which protrudes beyond the edge of the mold whereby a fitting surface is formed having handling means; removing the plaster from the mold after the hardening thereof, said plaster comprising the first model half of the articulators; applying a coating of separating material to the first model half; thereafter filling the other side of the denture impression with plaster; also filling said mold with plaster; pressing the first model half and said other side of the impression, with plaster therein, into the mold filled with the unhardened plaster to form a second model half; the first model half of the articulators being guided by said mold during the pressing thereof into the unhardened plaster of the second model half; the fitting surface of the first model half forming a complementary surface in the soft plaster of the second model half; removing the mold from the second model half after the plaster in said mold has hardened; and removing said denture impression.

2. The process for molding plaster articulators which consists in filling one side of a denture impression with plaster; also filling a mold with plaster; pressing the filled side of the denture impression into the plaster in said mold; said mold having axially perpendicular notches on the upper edge thereof; removing the excess plaster which protrudes from the mold whereby grooves are formed in the plaster in alignment with said notches; the plaster in said mold and in said filled side of the impression comprising a first model half of the articulators; removing the first model half from said mold after the hardening of said plaster; said impression remaining connected with the plaster; filling said mold and the other side of said denture impression with plaster; and pressing the first model half, together with the filled denture impression, into the unhardened plaster in the plaster filled mold whereby a second model half of said articulators is formed; the first model half being guided by said mold during the pressing thereof into the second model half; removing the excess plaster from the mold; and after the hardening of said second model half, removing said mold and said denture impression.

3. The method for the molding of plaster articulators which consists in filling in a denture impression unilaterally with plaster; pressing the filled side of the impression into a plaster filled mold; removing the excess plaster which protrudes beyond the edge of the mold whereby a fitting surface is formed having handling means; removing the plaster from the mold after the hardening thereof, said plaster comprising a first model half of the articulators; thereafter filling the other side of the denture impression with plaster while still secured to the first model half; also filling said mold with plaster; pressing the first model half and said filled other side of the impression into the mold filled with the unhardened plaster to form a second model half; the first model half of the articulators being guided by said mold during the pressing thereof into the unhardened plaster of the second model half; the fitting surface of the first model half forming a complementary surface in the soft plaster of the second model half; removing the mold from the second model half after the plaster in said mold has hardened; and removing said denture impression.

WILLY KLEINER.

REFERENCES CITED

The following references are of record in the file of this patent:

UNITED STATES PATENTS

| Number | Name | Date |
|---|---|---|
| 1,378,064 | Terranova | May 17, 1921 |
| 1,666,232 | Boynton | Apr. 17, 1928 |
| 1,921,925 | Johnson | Aug. 8, 1933 |
| 2,152,738 | Jeffery | Apr. 4, 1939 |
| 2,354,026 | Jungersen | July 18, 1944 |